(12) United States Patent
Choi et al.

(10) Patent No.: US 7,092,455 B2
(45) Date of Patent: Aug. 15, 2006

(54) DIGITAL VSB TRANSMISSION SYSTEM

(75) Inventors: In Hwan Choi, Seoul (KR); Young Mo Gu, Seoul (KR); Kyung Won Kang, Seoul (KR); Kook Yeon Kwak, Kyongg-do (KR)

(73) Assignee: LG Electronics Inc., Seoul (KR)

( * ) Notice: Subject to any disclaimer, the term of this patent is extended or adjusted under 35 U.S.C. 154(b) by 670 days.

(21) Appl. No.: 09/991,439

(22) Filed: Nov. 16, 2001

(65) Prior Publication Data

US 2002/0186780 A1   Dec. 12, 2002

(30) Foreign Application Priority Data

Jun. 11, 2001   (KR) ............................... 2001-32610

(51) Int. Cl.
*H04L 27/04* (2006.01)
*H03C 1/52* (2006.01)

(52) U.S. Cl. ..................... 375/301; 375/265; 375/270

(58) Field of Classification Search ................ 375/265, 375/270, 300, 301, 295; 348/495, 469; 370/535; 714/792
See application file for complete search history.

(56) References Cited

U.S. PATENT DOCUMENTS

| | | | |
|---|---|---|---|
| 5,087,975 A | 2/1992 | Citta et al. | |
| 5,233,630 A | 8/1993 | Wolf | |
| 5,488,691 A | 1/1996 | Fuoco et al. | |
| 5,555,024 A | 9/1996 | Limberg et al. | |
| 5,563,884 A | 10/1996 | Fimoff et al. | |
| 5,583,889 A | 12/1996 | Citta et al. | |
| 5,600,677 A | 2/1997 | Citta et al. | |
| 5,602,595 A | 2/1997 | Citta et al. | |
| 5,629,958 A | 5/1997 | Willming | |
| 5,636,251 A | 6/1997 | Citta et al. | |
| 5,636,252 A | 6/1997 | Patel et al. | |
| 5,706,312 A | 1/1998 | Wei | |
| 5,831,690 A | 11/1998 | Lyons et al. | |
| 5,923,711 A | 7/1999 | Willming | |
| 5,946,047 A | 8/1999 | Levan | |
| 5,966,401 A * | 10/1999 | Kumar | ........................ 375/150 |
| 6,075,569 A | 6/2000 | Lee et al. | |
| 6,118,825 A * | 9/2000 | Ikeda et al. | .................. 375/259 |
| 6,208,643 B1 | 3/2001 | Dieterich et al. | |

(Continued)

FOREIGN PATENT DOCUMENTS

KR   2000-0018531 A   4/1997

(Continued)

OTHER PUBLICATIONS

U.S. Appl. No. 60/198,014, Bretl et al.

*Primary Examiner*—Kevin Burd
*Assistant Examiner*—Freshteh N Aghdam
(74) *Attorney, Agent, or Firm*—Lee, Hong, Degerman, Kang & Schmadeka, P.C.

(57) ABSTRACT

A digital VSB transmission system that is able to send supplemental data along with MPEG image/sound data is enclosed. The system initially encodes the supplemental data symbol to generate a parity bit, and it multiplexes the parity bit with a predefined sequence and transmits the multiplexed data to a receiver. The system is compatible with the existing ATSC 8T-VSB receivers that are already on the market. It can have advantages over the other type of VSB transmission systems that transmit only the predefined sequence. In addition, the system according the to the present invention results a improved robustness against ghost and noise signals in a channel compared to systems using only the ½ rate convolutional encoding.

9 Claims, 9 Drawing Sheets

U.S. PATENT DOCUMENTS

| | | |
|---|---|---|
| 6,490,002 B1 | 12/2002 | Shintani |
| 6,519,298 B1 | 2/2003 | Kim |
| 6,690,738 B1 | 2/2004 | Swenson et al. |
| 6,697,098 B1 | 2/2004 | Wang |
| 6,704,366 B1 * | 3/2004 | Combes et al. ............. 375/260 |
| 6,708,149 B1 | 3/2004 | Turin |
| 6,724,832 B1 | 4/2004 | Hershberger |
| 6,744,822 B1 | 6/2004 | Gaddam et al. |
| 6,760,077 B1 | 7/2004 | Choi et al. |
| 6,763,025 B1 | 7/2004 | Leatherbury et al. |
| 6,788,710 B1 * | 9/2004 | Knutson et al. ............ 370/535 |
| 2002/0085632 A1 | 7/2002 | Choi et al. |
| 2004/0207757 A1 * | 10/2004 | Fimoff ........................ 348/555 |
| 2004/0240590 A1 | 12/2004 | Cameron et al. |

FOREIGN PATENT DOCUMENTS

| | | |
|---|---|---|
| KR | 2000-0028757 A | 5/2000 |

* cited by examiner $g_i, h_i \in \{0,1\}, i=1...M-1$ $g_i, h_i \in \{0,1\}, i=1...M-1$

DIGITAL VSB TRANSMISSION SYSTEM

This application claims the benefit of the Korean Application No. P2001-32610 filed on Jun. 11, 2001, which is hereby incorporated by reference.

BACKGROUND OF THE INVENTION

1. Field of the Invention

The present invention relates to a digital data communication system, and more particularly, to a vestigial sideband (VSB) transmission system.

2. Background of the Related Art

The Advanced Television Systems Committee (ATSC) has selected the 8 Trellis-Vestigial Sideband (8T-VSB) modulation method as a standard in 1995 for the U.S. digital terrestrial television broadcasting, and the actual broadcasting incorporating the method has started since the second half of the year 1998. FIG. 1 illustrates an existing ATSC 8T-VSB transmitter according to the background art. It includes a data randomizer 1, a Read-Solomon encoder 2, a data interleaver 3, a trellis encoder 4, a multiplexer 5, a pilot inserter 6, a Vestigial Sideband (VSB) modulator 7, a radio frequency (RF) converter 8, and an antenna 9. Initially, the data randomizer 1 randomizes the input data received and outputs the randomized data to the Read-Solomon encoder 2. Then the Read-Solomon encoder 2 encodes (Read-Solomon encoding) the randomized data and adds a 20 bytes parity code. Next, the data interleaver 3 interleaves the data, and the trellis encoder 4 converts the interleaved data into symbols and performs the trellis encoding. After the multiplexer 5 multiplexes the trellis-encoded data and the sync signals, the pilot inserter 6 adds a pilot signal to the multiplexed symbols. Thereafter, the VSB modulator 7 modulates the symbols to 8T-VSB signals and outputs them to the RF converter 8. Finally, the RF converter 8 converts the 8T-VSB signals into RF signals, and the RF signals get transmitted to a receiving system.

FIG. 2 illustrates an existing ATSC 8T-VSB receiver according to the background art. It includes a demodulator 11, a comb filter 12, a slicer predictor 14, a channel equalizer 13, a phase tracker 15, a trellis decoder 16, a data deinterleaver 17, a Read-Solomon decoder 18, and a data derandomizer 19. Initially, the demodulator 11 converts the RF signals received through an antenna 10 into baseband signals. Then the comb filter 12 eliminates the interference signals from the signals, and the channel equalizer 13 compensates the distorted channels using the slicer predictor 14. Thereafter, the phase tracker 15 tracks the phases of the received signals, and the trellis decoder 16 decodes the phase tracted data in order for the symbol-byte converting. After the data deinterleaver 17 deinterleaves the signals received, the Read-Solomon decoder 18 decodes the Read-Solomon encoded signals. Finally, the derandomizer 19 derandomizes the decoded signals.

It is very important to note that the existing ATSC 8T-VSB receiver is able to receive only MPEG (Moving Picture Experts Group) data, but not any other supplemental data such as program execution files or certificate information. In other words, the existing ATSC 8T-VSB transmitter and receiver are only for MPEG image or sound data. In order to satisfy various demands of many users (viewers), the system should be able to send or receive the supplemental information as well as the image/sound data through digital broadcasting channels.

In addition, it is expected that some of the users will have to use a portable device or a personal computer (PC) card attached with a simple antenna in order to receive the supplemental data. In a case when a system receives data in a room, the data reception performance is generally poor due to the noises and ghosts resulted from reflected waves and many other factors. It is important to note that the supplemental data transmission must have a lower error rate compared to the image/sound data transmission. That's because even one bit error in the supplemental data transmission can create a very serious problem. Therefore, the system must be able to overcome the ghosts and noises generated in the channel.

Normally, the supplemental data will be transmitted together with the MPEG image/sound data using a time-sharing method. However, many ATSC VSB digital broadcasting receivers that can receive only the MPEG data are already on the market. Therefore, the supplemental data subjected to be transmitted with the MPEG data should not have any effect on the existing receivers for properly receiving the MPEG data. In other words, the supplemental data transmission system should be compatible with the existing ATSC VSB receivers.

SUMMARY OF THE INVENTION

Accordingly, the present invention is directed to a digital VSB transmission system that substantially obviates one or more problems due to limitations and disadvantages of the related art.

An object of the present invention is to provide a digital VSB transmission system that can send MPEG image/sound data together with supplemental data and is still compatible with the existing ATSC 8T-VSB receivers.

Another object of the present invention is to provide a digital VSB transmission system that has an improved robustness against the noise and ghost signals and has a greater encoding gain by multiplexing the predefined sequence with the supplemental data encoded with a ½ coding rate.

Additional advantages, objects, and features of the invention will be set fourth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a digital VSB transmission system according to the present invention includes a supplemental data processor processing input data including Read-Solomon encoding, inserting a predefined sequence, and inserting an MPEG header; a first multiplexer multiplexing MPEG data and the data processed in the supplemental data processor; a data encoding part processing the multiplexed data including data randomizing, adding a first Read-Solomon parity, data interleaving, and byte-symbol converting in order to generate an input data symbol; a supplemental data symbol processor encoding an information bit of the input data symbol with a ½ coding rate and multiplexing the encoded information bit with the predefined sequence; a data decoding part processing the data processed in the supplemental data symbol processor including symbol-byte converting, data deinterleaving, eliminating the first Read-Solomon parity added in the data encoding part; and a VSB transmitter processing the data processed in the data decoding part starting from Read-Solomon encoding, data interleaving, trellis encoding, VSB modulating, and transmitting to a receiving side.

The VSB transmission system further includes a control signal generator generating a first control signal indicating whether the input data symbol is a supplemental data symbol and generating a second control signal based on the first control signal, the control signal generator providing the control signals to the supplemental data symbol processor.

The supplemental data symbol processor used in the VSB transmission according to the present invention includes a ½ rate convolutional encoder outputting the information bit as a first output bit and encoding the information bit with the ½ coding rate to generate a third parity bit; and a second multiplexer multiplexing the third parity bit with the predefined sequence based on the second control signal in order to generate a second output bit.

In another aspect of the present invention, a digital VSB transmission system includes: a first selecting element selecting a previous second register value if the first control signal indicates that the input data symbol is the supplemental data symbol and otherwise selecting a previous first register value; a first register storing the value selected by the first selecting element; an adder adding the value stored in the first register and the information bit of the input data symbol; a second selecting element selecting the value added by the adder if the first control signal indicates that the input data symbol is the supplemental data symbol and otherwise selecting the previous second register value; a second register storing the value selected by the second selecting element; a third selecting element selecting the value stored in the second register if the second control signal indicates that the input data symbol is the supplemental data symbol and otherwise selecting the predefined sequence of the input data symbol; and a fourth selecting element selecting the value selected by the third selecting element if the first control signal indicates that the parity bit of the ½ rate encoder will not be punctured otherwise selecting the predefined sequence (lower bit) of the input data symbol. The information bit and the value selected by the fourth selecting element become a first and second output bits, respectively, and the previous first and second register values are values previously stored in the first and second registers, respectively.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 3:
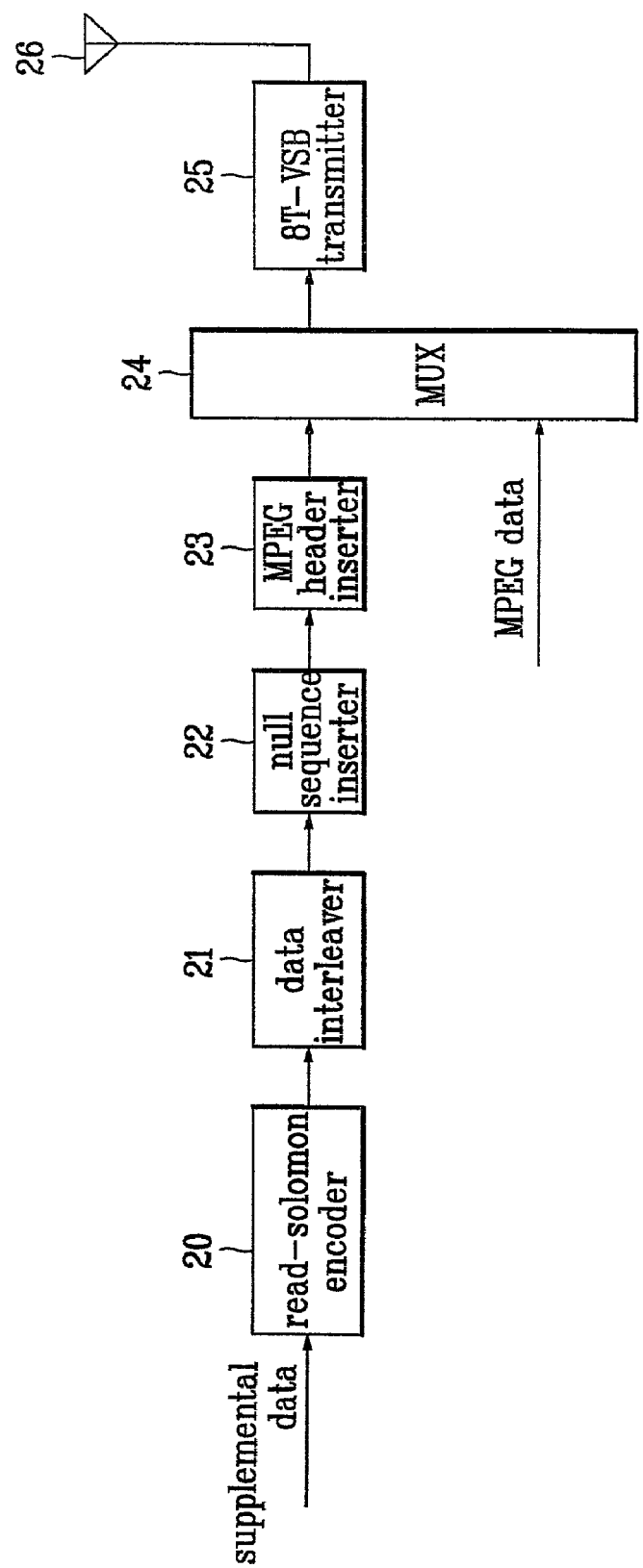
FIG. 3 illustrates a digital VSB transmission system according to the present invention.

FIG. 3 illustrates a digital VSB transmission system according to the present invention. While being compatible with the existing ATSC 8T-VSB receivers, the system is able to send supplemental data together with the MPEG image/sound data. As shown in FIG. 3, the Read-Solomon encoder 20, data interleaver 21, null sequence inserter 22, and MPEG header inserter 23 of the system perform necessary processes on the supplemental data in order to make their structure identical to the MPEG transport packets. In order to achieve that, the Read-Solomon encoder 20 initially encodes the input supplemental data to add a 20 bytes parity code, and subsequently, the data interleaver (21) interleaves the encoded data to increase the robustness against noise signals. Thereafter, the null sequence inserter 22 inserts a null sequence to the interleaved data in order to be able to receive the data properly even in a poor channel environment.

Figure 4:
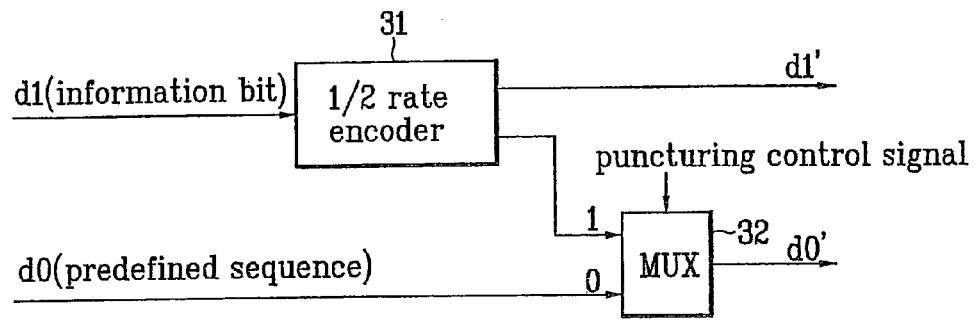
FIG. 4 illustrates a process of inserting a null sequence by a null sequence inserter shown in FIG. 3.

FIG. 4 illustrates a process of inserting a null sequence to the supplemental data by the null sequence inserter 22 shown in FIG. 3. As shown in FIG. 4, when one bit of input data is inputted, a total of two output bits are generated after a single null bit is inserted.

Figure 1:
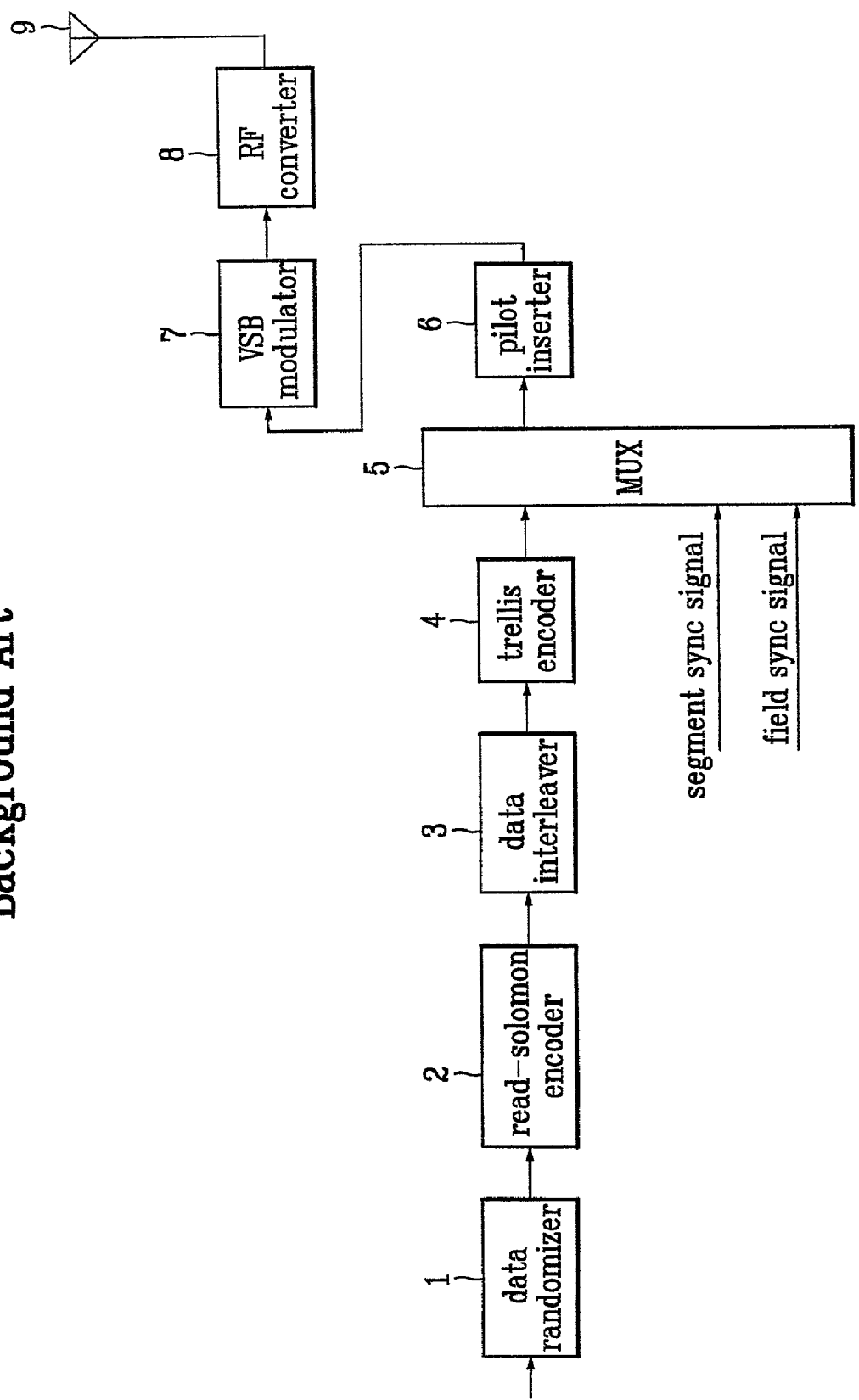
FIG. 1 illustrates an existing ATSC 8T-VSB transmitter according to the background art.
Figure 2:
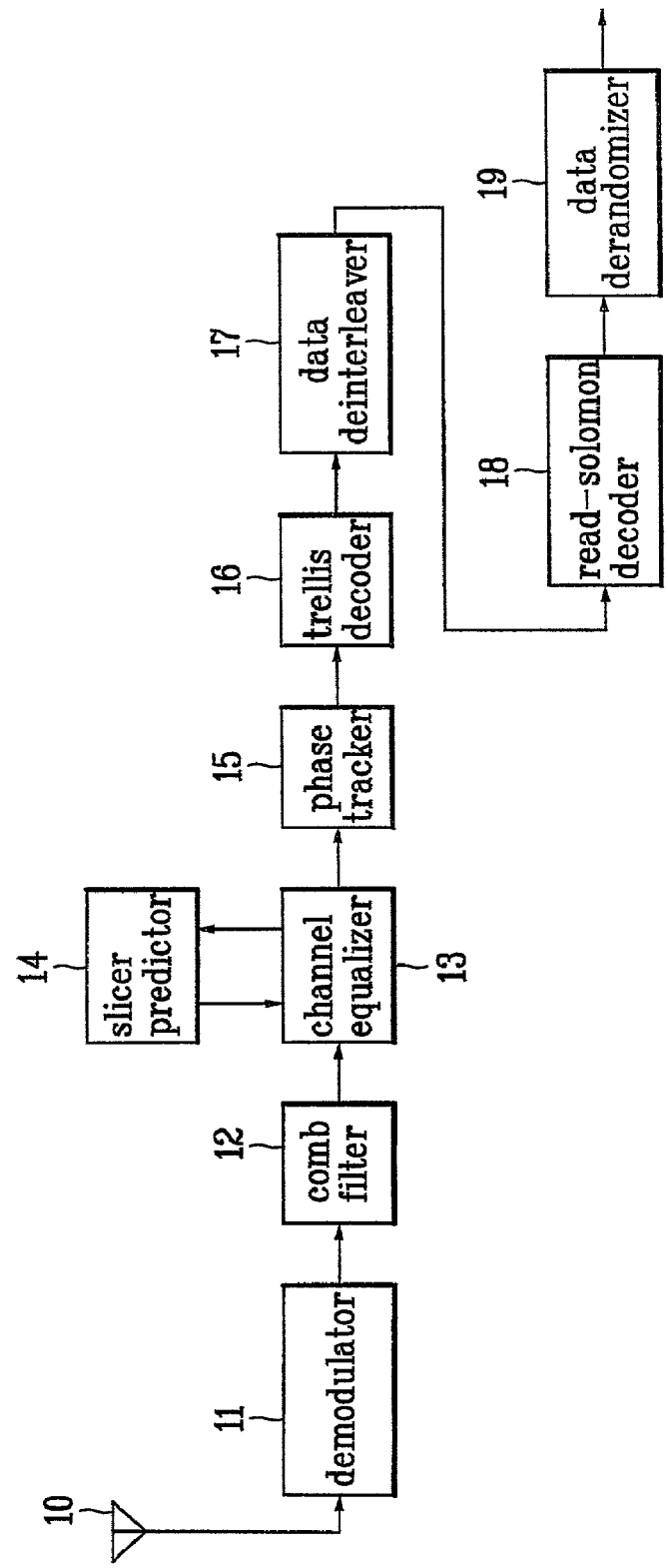
FIG. 2 illustrates an existing ATSC 8T-VSB receiver according to the background art.

After the null sequence inserter 22 inserts each null bit, the MPEG header inserter 23 inserts a 3 bytes MPEG header so that the format of the supplemental data becomes identical to that of the MPEG transport packets. Thereafter, the multiplexer 24 multiplexes (time-division) the supplemental data with the MPEG image/sound data and outputs the multiplexed data to the existing 8T-VSB transmitter 25. The detailed structure of the existing 8T-VSB transmitter 25 is shown in FIG. 1.

Namely, the 164 bytes of the supplemental data packets become 184 bytes of data packets after being encoded in the Read-Solomon encoder 20 and become two sets of 184 bytes packets after being processed in the data interleaver 21 and the null sequence inserter 22. Thereafter, after the 3 bytes MPEG transport header is added in the MPEG header inserter 23, two sets of 187 bytes packets are output to the multiplexer 24. The multiplexer multiplexes the two sets of the supplemental data with the MPEG transport packets in segment units, and finally, the 8T-VSB transmitter 25 transmits the multiplexed data to a receiver.

The null bits added to the supplemental data go through the processes including the randomizing and Read-Solomon encoding in the 8T-VSB transmitter 25. Then the null bits of the encoded supplemental data are inputted (as d0) to a trellis encoder of the transmitter 25. In addition, an information bit of the encoded supplemental data is inputted (as d1) to the trellis encoder. d0 and d1 correspond to a lower and higher input bits, respectively. The line of the bits being inputted as d0 to the trellis encoder will be called as a predefined sequence for the convenience.

In other words, after the null bits convert to the predefined sequence, the trellis encoder inputs the predefined sequence as d0 . Then the VSB receiver regenerates a predefined sequence in order to improve the performances of the channel equalizer, the slicer predictor and/or the trellis decoder.

Figure 5:
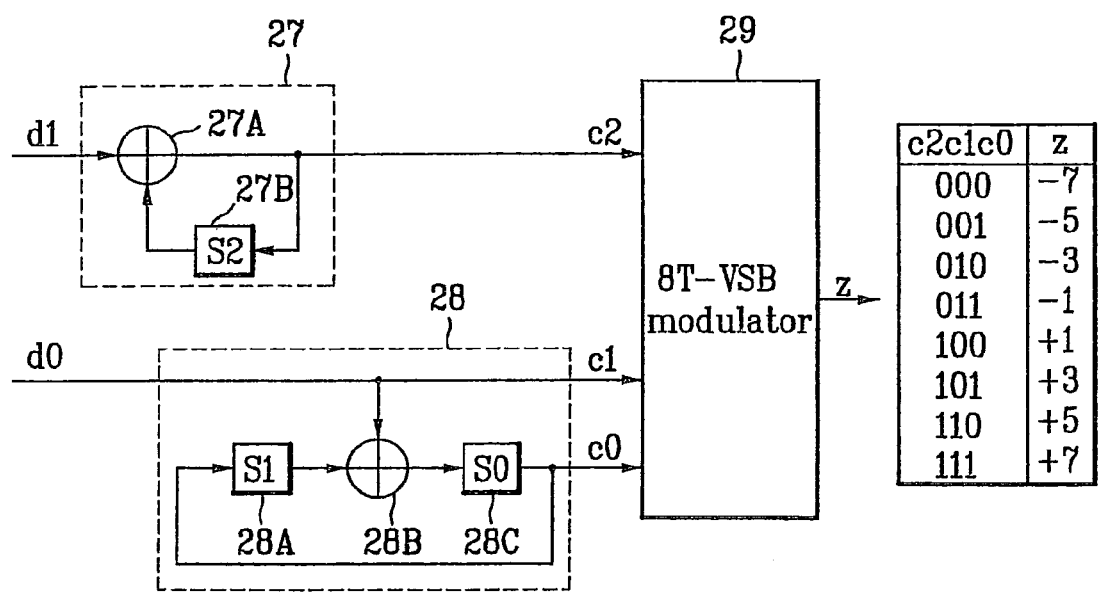
FIG. 5 illustrates a trellis encoder and a precoder of the ATSC 8T-VSB transmitter shown in FIG. 3.

FIG. 5 illustrates a trellis encoder and a precoder used in the ATSC 8T-VSB transmitter 25 shown in FIG. 3. The trellis encoder 28 and the precoder 27 encode the input bits d0 and d1, respectively, and they generate the output bits c0, c1, and c2. The 8T-VSB modulator generates an 8 level modulation value (z) corresponding to the output bits received. 27A and 28B represent adders, and 27B, 28A, and 28C represent registers. In addition, the trellis encoder 28 and the precoder 27 together are often called as a trellis encoder.

As shown in FIG. 5, the precoder 27 precodes the higher input bit d1 and generates c2 and the lower input bit d0 becomes c1. However, the output bit c0 depends on the value stored in the register 28A. The VSB modulator 29 determines the modulation level z based on c0, c1 and c2. After the supplemental data and the MPEG data are sent, the existing 8T VSB receiver receives only the MPEG transport packets using the packet identification (PID) given by the transport packet header, and the receiver discards the supplemental data. On the other hand, the receivers being able to receive the supplemental data demultiplexes the multiplexed data using appropriate information, and they perform further necessary processes on the supplemental data.

According to the present invention, instead of transmitting the predefined sequence included in the supplemental data symbol as shown in FIG. 5, the system multiplexes the predefined sequence of the supplemental data symbol with a parity bit generated by encoding the supplemental data symbol, and it transmits the multiplexed data. Therefore, the system can maintain its ghost/noise eliminating capability and still have a greater coding gain. In order to maintain the transmission rate of the supplemental data, a puncturing code is used instead of a ½ rate code. These are shown in FIG. 6.

Figure 6:
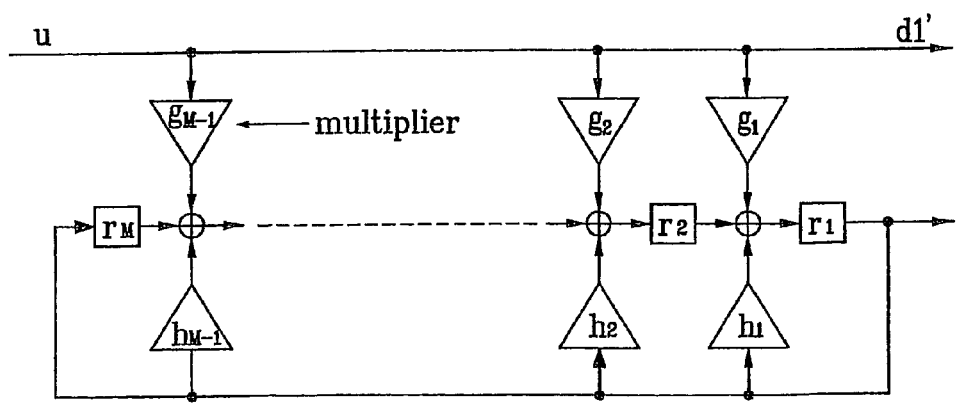
FIG. 6 illustrates a supplemental data symbol processor used in the VSB transmission system according to the present invention.

FIG. 6 illustrates a supplemental data symbol processor of the digital VSB transmission system according to the present invention. As shown in the figure, the processor includes a ½ rate encoder 31 and a multiplexer 32. A supplemental data symbol includes an information bit d1 and a predefined sequence d0. Initially, d1 and d0 are inputted to the ½ rate encoder 31 and the multiplexer 32, respectively. Then the ½ rate encoder 31 outputs d1 directly as the first output bit d1', encodes d1 using a ½ coding rate in order to create a parity bit, and outputs the party bit to the multiplexer 32. Then the multiplexer 32 selects one of the parity bit and the predefined sequence d0 based on the puncturing control signal received and outputs the selected data as d0'. Eventually, d1' and d0' will be inputted to the precoder 33 and the trellis encoder 34 of the ATSC 8T-VSB transmitter, respectively, as shown in FIG. 6.

The puncturing control signal is a control signal corresponding to the supplemental data only. A fixed pattern is repeated to form a puncturing control signal. For example, in a case where "10" is repeated in the signal, the multiplexer 32 outputs the parity bit and the predefined sequence alternatively. In this case, the coding rate becomes ⅔ since there are two input bits and three output bits. On the other hand, if "100" is repeated, the multiplexer 32 outputs the parity bit once and subsequently outputs the predefined sequence twice. Therefore, the corresponding coding rate becomes ¾.

The value and the length of the puncturing pattern can be determined arbitrarily. If the puncturing pattern includes only "1", then the puncturing control signal also includes only "1". Therefore, the multiplexer 32 always outputs the parity bit to the trellis encoder 34. None of the predefined sequence gets transmitted. On the other hand, if the puncturing pattern includes only "0", then the multiplexer 32 outputs only the predefined sequence. As it is shown, the present invention can be used as several different type systems.

Figure 7:
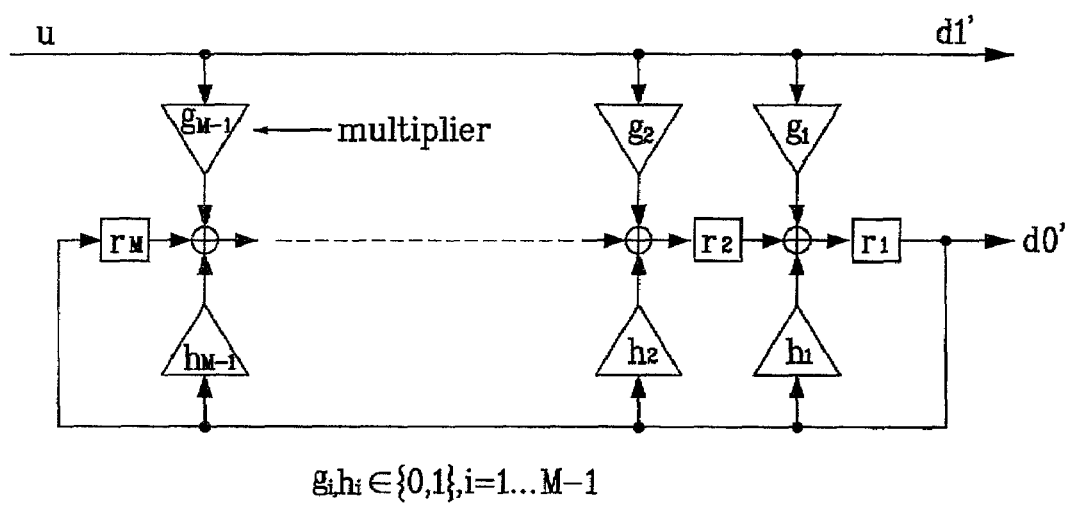
FIG. 7 illustrates a general structure of a ½ rate convolutional encoder used in the VSB transmission system according to the present invention.

In addition, the trellis encoder 34 encodes the parity bit generated by encoding the information bit d1 in the ½ rate encoder 31. Therefore, it is preferable to use a convolutional encoder having a feedback structure for the ½ rate encoder 31. FIG. 7 illustrates a general structure of a ½ rate convolutional encoder used in the digital VSB transmission system according to the present invention. As it is shown in the figure, an information bit u becomes an output bit d1', and the value stored in the register r1 becomes a parity bit d0'. The encoder includes a first set of multipliers where an ith multiplier multiplies the value stored in the register r1 with a given constant $h_i$; a second set of multipliers where an ith multiplier multiplies the input information bit u with a given constant $g_i$; a set of adders where an ith adder adds the outputs from the corresponding multipliers and $r_{i+1}$ for i=1, 2, 3, . . . , M−1; and a set of registers $r_1, r_2, \ldots, r_M$ where an ith register $r_i$ stores the value calculated by the ith adder for i=1, 2, 3, . . . , M−1, an Mth register $r_M$ stores a previous first register value. The values of the given constants are such that $g_i, h_i \epsilon \{0,1\}$, and i=1, 2, . . . , M−1.

Figure 8A:
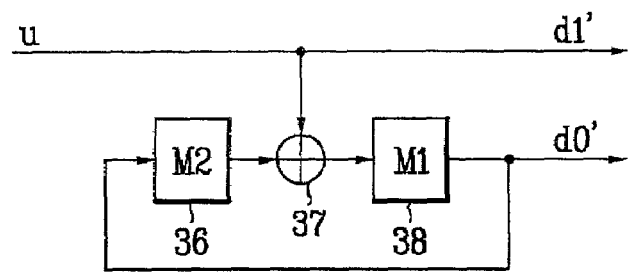
FIG. 8 illustrates a first example of the convolutional encoder used in the VSB transmission system according to the present invention.
Figure 8B:
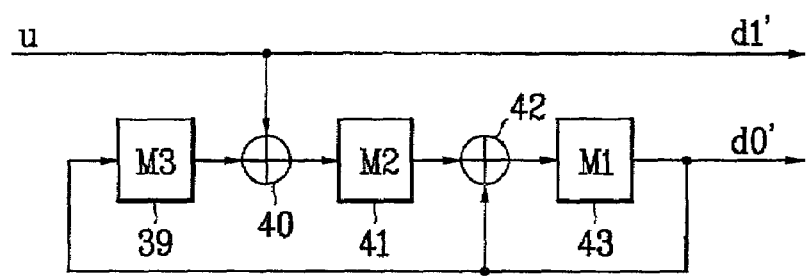
Figure 8C:
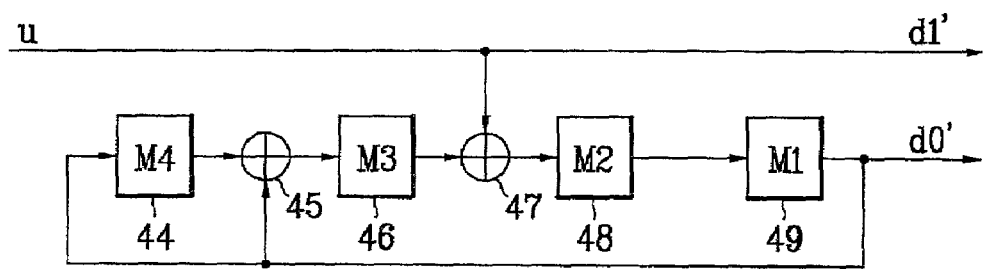

FIG. 8A, FIG. 8B, and FIG. 8C illustrate several specific examples of the general structure of a ½ rate convolutional encoder used in the digital VSB transmission system according to the present invention. The convolutional encoder shown in FIG. 8A includes a first register M2 36 storing a previous register value, an adder 37 adding the value stored in M2 36 and the information bit u, a second register M1 storing the added value and outputting the value stored which is the parity bit.

FIG. 8B shows a second example of the convolutional encoder according to the present invention. Similarly, the encoder includes a first register M3 39 storing a previous third register value, a first adder 40 adding the value stored in M3 and the information bit u, a register M2 41 storing the value added in the first adder 40, a second adder 42 adding the value stored in the register M2 41 and the previous third register value, and a third register M1 43 storing the value of the second adder 42 and outputting the stored value which is also the parity bit.

FIG. 8C shows another example of the convolutional encoder according to the present invention. The encoder includes a register M4 44 storing d0', a first adder 45 adding the value stored in the register M4 44 and d0', a register M3 46 storing the value of the first adder 45, a second adder 47 adding the value stored in the register M3 46 and the information bit u, a register M2 48 storing the value of the second adder 47, a register M1 49 storing the value stored in the register M3 46 and outputting the stored value.

In a case where the input symbol is not the supplemental data (i.e., MPEG image/sound data), the values stored in the registers of the convolutional encoder must not be changed due to the information bit d1. That is, the convolutional encoder 31 shown in FIG. 6 must encode only the supplemental data symbols to which a null bit is inserted. Therefore, each register of the convolutional encoder must maintain its value if the input symbol is not the supplemental data symbol.

The convolutional encoder carries out its function depending on whether the input symbol is a supplemental data symbol including a predefined sequence. If it is, an information bit becomes d1 and d1', and the predefined sequence becomes d0. The multiplexer 32 shown in FIG. 6 multiplexes a parity bit obtained by encoding the information bit and the predefined sequence based on the puncturing control signal in order to generate d0'. Otherwise, the information bit becomes both of d1' and d0'. In total, twelve convolutional encoders are used in the system, each being in accordance with each trellis encoder.

Figure 9:
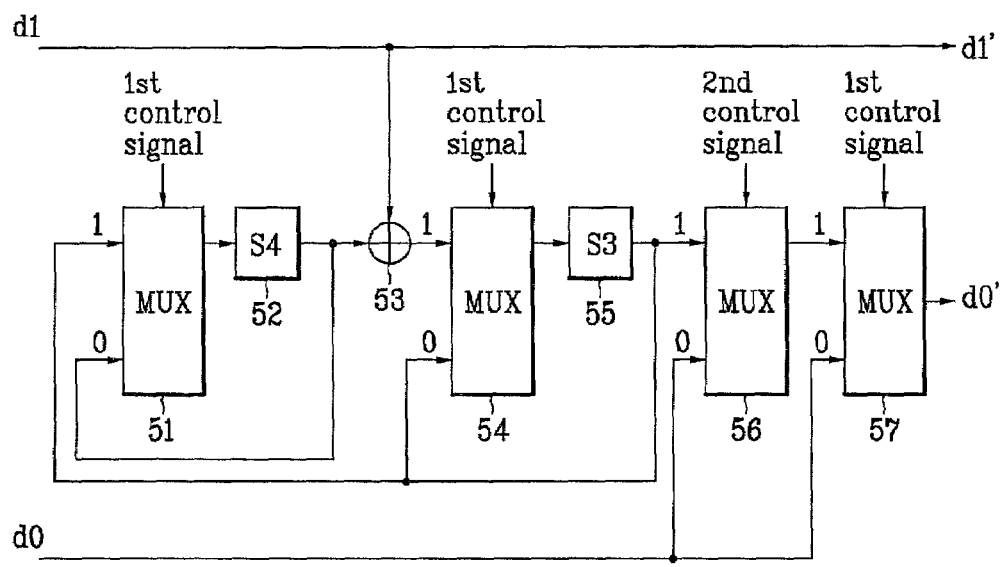
FIG. 9 illustrates a second example of the convolutional encoder used in the VSB transmission system according to the present invention.

FIG. 9 illustrates a ½ convolutional encoder according to the present invention. It has a structure similar to FIG. 8A, but it further includes several multiplexers. We will also call the encoder shown in FIG. 9 as a supplemental data symbol processor. This processor shows the case where the encoder shown in FIG. 8A is employed as a ½ rate convolutional encoder, and it can be applied to the general structure shown in FIG. 7. The encoder shown in FIG. 9 includes a first multiplexer 51 outputting one of values previously stored in registers S3 and S4 based on the first control signal, a first register S4 storing the value outputted from the first multiplexer 51, and an adder 53 adding the input bit d1 and the value stored in S4. It further includes a second multiplexer 54 outputting the value added in the adder 53 or the value previously stored in S3 based on the first control signal, a second register S3 storing the value outputted from the second multiplexer 54, a third multiplexer 56 outputted the value stored in S3 or the input bit d0 based on the second control signal, and a fourth multiplexer 57 outputting the value outputted from the third multiplexer 56 or the input bit d0 based on the first control signal.

The first control signal used by first, second and fourth multiplexers (51, 54, and 57) indicates whether the input symbol is a supplemental data symbol. For example, if it is, the control signal includes "1". Otherwise, it includes "0". If the first control signal includes "1", the first multiplexer 51 outputs the value previously stored in the second register S3 to the register S4. On the other hand, if the first control signal includes "0", it outputs the value previously stored in the register S4 to the register S4 so that it can maintain its value regardless of the input bit d1. Similarly, the second multiplexer 54 outputs the value added in the adder 53 to the register S3 if the first control signal includes "1", and otherwise, it outputs the value previously stored in the register S3 to the register S3. The fourth multiplexer (57) outputs the value outputted from the second multiplexer 56 if the first control signal includes "1", and otherwise, it outputs the input bit d0.

The third multiplexer 56 shown in FIG. 9 outputs the parity bit or the predefined sequence to the fourth multiplexer 57 depending on the second control signal which is identical to the puncturing control signal shown in FIG. 6. Therefore, if the second control signal includes "1", the third multiplexer 56 outputs the value previously stored in the second register S3, which is the parity bit. On the other hand, if it includes "0", the third multiplexer 56 outputs the predefined sequence d0 to the fourth multiplexer 57.

Figure 10:
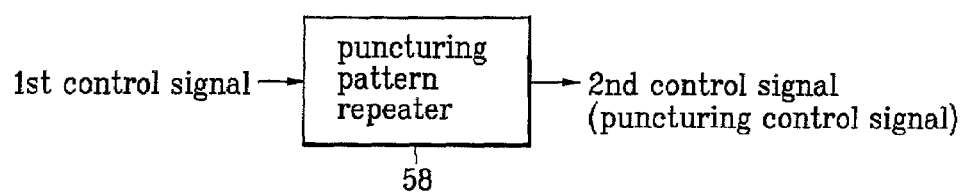
FIG. 10 illustrates a third example of the convolutional encoder used in the VSB transmission system according to the present invention.

FIG. 10 illustrates a control signal generator used in the VSB transmission system according to the present invention. The puncturing pattern repeater 58 shown in FIG. 10 generates a second control signal (puncturing control signal) based on the first control signal. The second control signal becomes active only for supplemental data symbols. Namely, the puncturing pattern repeater 58 generates the second control signal by repeating the predetermined puncturing pattern if the first control signal indicates that the input symbol is the supplemental data symbol. For example, if the predetermined pattern is "100", the puncturing pattern repeater 58 generates the second control signal by repeating "100" while each supplemental data symbol is being inputted.

In addition, since the predefined sequence of the supplemental data symbol is changed in the supplemental data symbol processor shown in FIG. 9, errors are often occurred when the ATSC 8T-VSB receiver performs the Read-Solomon decoding on the supplemental data packets. In order to avoid such errors, the Read-Solomon parity byte corresponding to the data changed by the supplemental data symbol processor must be regenerated. That is, the Read-Solomon parity byte added before the supplemental data symbol processing step must be eliminated, and a new Read-Solomon parity byte must be added to the convolutionally encoded supplemental data. For this reason, the output data of the supplemental data symbol processor should be converted (symbol-byte) and deinterleaved, then the initially calculated Read-Solomon parity is eliminated after the symbol-byte converting and data deinterleaving are performed on the output data of the supplemental data symbol processor. Thereafter, the ATSC 8T-VSB transmitter that does not have a data randomizer adds a Read-Solomon parity by performing the Read-Solomon encoding. Since the parity now corresponds to the ½ convolutionally encoded data, the ATSC 8T-VSB receiver is able to perform the Read-Solomon decoding without any problem. These processes are shown in FIG. 11

Figure 11:
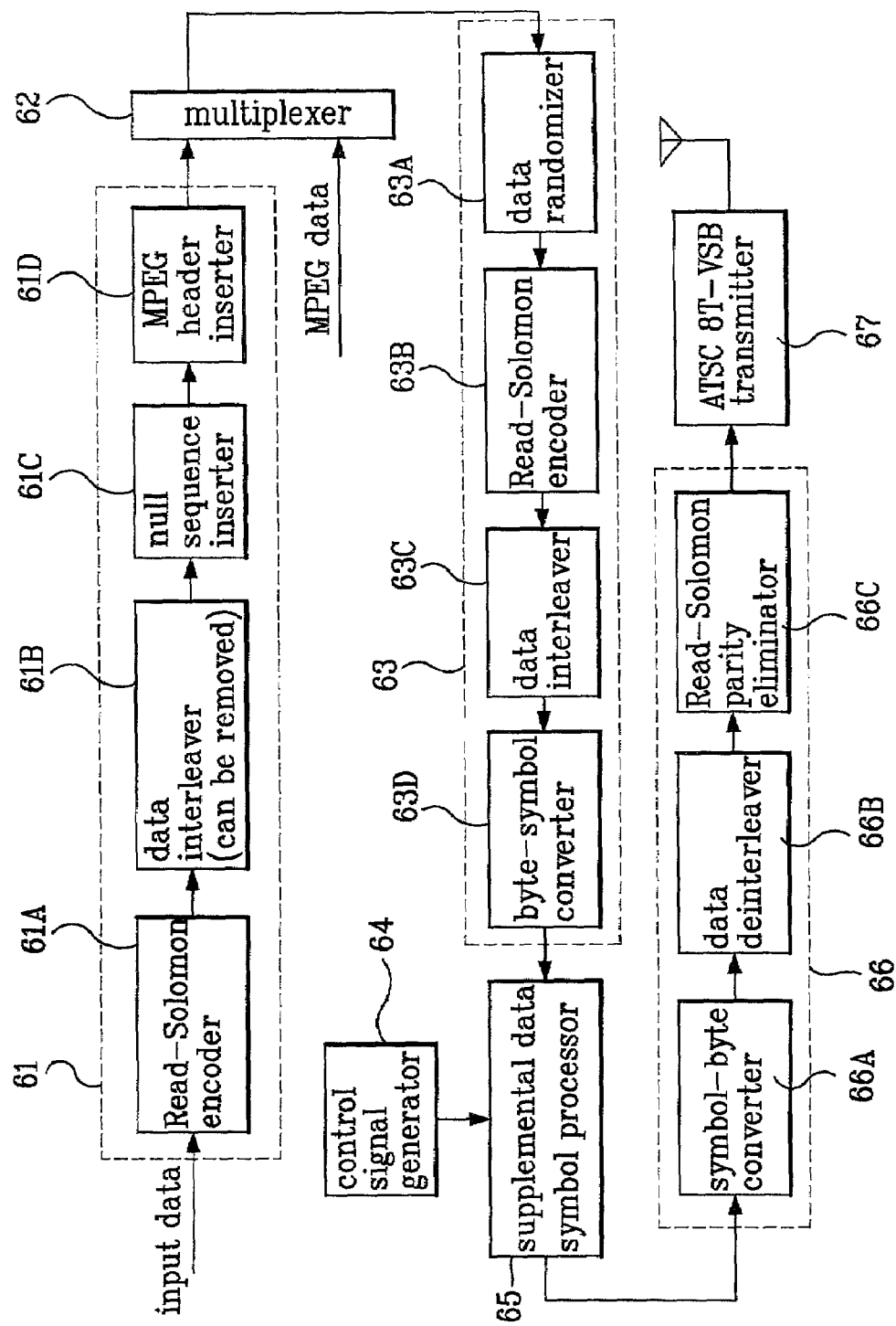
FIG. 11 illustrates a VSB transmission system according to the present invention.

FIG. 11 illustrates an entire digital VSB transmission system according to the present invention. The system includes a supplemental data processor 61 performing the Read-Solomon encoding, null sequence inserting, and MPEG header inserting processes; a multiplexer 62 outputting the supplemental data packets received from the supplemental data processor 61 or MPEG data packets; a first encoding part 63 performing the data randomizing, Read-Solomon data encoding, data interleaving, byte-symbol converting processes on the data packets received from the multiplexer 62; a control signal generator 64 generating first and second control signals indicative of a puncturing pattern and whether the symbol output from the first encoding part 63 is a supplemental data symbol, respectively; a supplemental data symbol processor 65 performing the ½ convolutional encoding on the symbol output from the first encoding part 63 and outputting the convolutionally encoded parity bit or the predefined sequence based on the second control signal if the first control signal indicates that the symbol output from the first encoding part 63 is a supplemental data symbol; a first decoding part 66 performing the symbol-byte converting, data deinterleaving, Read-Solomon parity eliminating processes on the data output from the supplemental data symbol processor 65; and an existing 8T-VSB transmitter 67 performing the Read-Solomon encoding, data interleaving, trellis encoding processes on the data whose parity bit is eliminated in the first decoding part 66. The existing 8T-VSB transmitter 67 is identical to the transmitter shown in FIG. 1 except that it does not include a data randomizer.

After passing through a Read-Solomon encoder 61A, data interleaver 61B, null sequence inserter 61C, and MPEG header 61D of the supplemental data processor 61, the supplemental data convert to data packets including a 20 bytes Read-Solomon parity, null sequence, and MPEG header. Thereafter, the multiplexer 62 outputs either the supplemental data packets or the MPEG data packets to the first encoding part 63. The main object of the first decoding part 66 and the ATSC 8T-VSB transmitter 67 is to maintain the backward-compatibility with the existing ATSC 8T-VSB receiver of the current market.

In other words, the data randomizer 63A of the first encoding part 63 performs the data randomizing process on the data received from the multiplexer 62, and the Read-Solomon encoder 63B adds a 20 bytes parity by performing the Read-Solomon encoding. Then the data interleaver 63C interleaves the data, and finally the byte-symbol converter 63D converts the interleaved data to a two bits symbol.

Thereafter, the supplemental data symbol processor 65 performs a ½ convolutional encoding based on the first control signal generated from the control signal generator 64, and it outputs the convolutionally encoded parity bit or a predefined sequence depending on the second control signal. This is explained in detail earlier using FIG. 6 and FIG. 10.

The symbol-byte converter 66A of the first decoding part 66 converts the symbols received from the supplemental data symbol processor 65 to byte data, and the data deinterleaver 66B deinterleaves the data. Next, the Read-Solomon parity eliminator 66C eliminates the Read-Solomon parity added in the Read-Solomon encoder 63B. Finally, the existing 8T-VSB transmitter 67 performs a Read-Solomon encoding process to add a Read-Solomon parity and other processes shown in FIG. 1. Therefore, the existing ATSC 8T-VSB receiver can decode Read-Solomon encoded data packets correctly and discard the supplemental data packets by reading the PID inserted in the MPEG header inserter 61D shown in FIG. 11.

As described above, the digital VSB transmission system according to the present invention transmits the supplemental data symbols after performing the ½ rate convolutional encoding process and multiplexing with a predefined sequence. Particularly, a puncturing code is used to maintain the transmission rate of the supplemental data, and a predefined sequence is transmitted for the punctured data instead of transmitting the ½ convolutionally encoded parity bit to achieve the following advantages. First, the digital transmission of the present invention is compatible with the existing ATSC 8T-VSB receivers, while being able to transmit the supplemental data with the MPEG data. Second, its robustness against ghost and noise signals is greater than that of the existing ATSC 8T-VSB transmitters. And finally, compared with the digital VSB transmission system that uses only a predefined sequence, it can have a greater coding gain. In addition, the digital VSB receiver receives the data and performs the reverse processes opposite to the processes performed by the transmission system.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A Vestigial Sideband (VSB) transmission system comprising:
   a supplemental data processor processing supplemental data including Reed-Solomon encoding, inserting a plurality of null bits, and inserting an MPEG header;
   a first multiplexer multiplexing MPEG data and said data processed in said supplemental data processor;
   a data encoding part processing said multiplexed data including data randomizing, adding a first Reed-Solomon parity, data interleaving, and byte-symbol converting in order to generate an input data symbol;
   a supplemental data symbol processor encoding an information bit of said input data symbol with a ½ coding rate;
   a data decoding part processing said data processed in said supplemental data symbol processor including symbol-byte converting, data de-interleaving, eliminating said first Reed-Solomon parity added in said data encoding part; and
   a VSB transmitter processing said data processed in said data decoding part including trellis encoding, adding a second Reed-Solomon parity, data interleaving, VSB modulating, and transmitting to a receiving side.

2. The VSB transmission system of claim 1 further comprising a control signal generator generating a first control signal indicating whether said input data symbol is a supplemental data symbol and generating a second control signal based on said first control signal, said control signal generator providing said control signals to said supplemental data symbol processor.

3. The VSB transmission system of claim 2, wherein said supplemental data symbol processor comprises:
   a ½ rate convolutional encoder outputting said information bit as a first output bit and encoding said information bit with said ½ coding rate to generate a third parity bit; and
   a second multiplexer multiplexing said third parity bit with a null bit based on said second control signal in order to generate a second output bit.

4. The VSB transmission system of claim 2, wherein said second control signal is a puncturing control signal having a puncturing pattern being repeated.

5. The VSB transmission system of claim 3, wherein said ½ rate convolutional encoder comprises:
   a first set of multipliers $G_1, G_2, G_3, \ldots G_{M-1}$, wherein $G_i$ multiplies said information bit with its given constant $g_i$;
   a second set of multipliers $H_1, H_2, H_3, \ldots H_{M-1}$, wherein $H_i$ multiplies a previous third parity bit value with its given constant $h_i$;
   a set of registers $r_1, r_2, r_3, \ldots r_{M-1}, r_M$, wherein $r_M$ stores said previous third parity bit value and $r_i$ stores a value obtained by adding outputs from $G_i$, $H_i$, and $r_{i+1}$; and
   a set of adders, wherein an ith adder adds said outputs from $G_i$, $H_i$, and $r_{i+1}$, where $g_i, h_i \epsilon \{0,1\} i = M-1, \ldots 3,2,1$, and the value being stored in $r_1$ is output as said third parity bit.

6. The VSB transmission system of claim 3, wherein said ½ rate convolutional encoder comprises:
   a first register storing a previous third parity bit value;
   an adder adding said value stored in said first register and said information bit of said input data symbol; and a second register storing said added value, where said value stored in said second register is output as said third parity bit.

7. The VSB transmission system of claim 3, wherein said ½ rate convolutional encoder comprises:
 a first register storing a previous third parity bit value;
 a first adder adding said value stored in said first register and said information bit of said input data symbol;
 a second register storing said value added by said first adder;
 a second adder adding said value stored in said second register and said previous third parity bit value; and
 a third register storing said value added by said second adder, where said value stored in said third register is output as said third parity bit.

8. The VSB transmission system of claim 3, wherein said ½ rate convolutional encoder comprises:
 a first register storing a previous third parity bit value;
 a first adder adding said value stored in said first register and said previous third parity bit value;
 a second register storing said value added in said first adder;
 a second adder adding said value stored in said second register and said information bit of said input data symbol;
 a third register storing said value added in said second adder; and
 a fourth register storing said value stored in said third register,
 where said value stored in said fourth register is output as said third parity bit.

9. The VSB transmission system of claim 2, wherein said supplemental data symbol processor comprises:
 a first selecting element selecting a previous second register value if said first control signal indicates that said input data symbol is said supplemental data symbol and otherwise selecting a previous first register value;
 a first register storing said value selected by said first selecting element;
 an adder adding said value stored in said first register and said information bit of said input data symbol;
 a second selecting element selecting said value added by said adder if said first control signal indicates that said input data symbol is said supplemental data symbol and otherwise selecting said previous second register value;
 a second register storing said value selected by said second selecting element;
 a third selecting element selecting said value stored in said second register if said second control signal indicates that said input data symbol is said supplemental data symbol and otherwise selecting a null bit ; and
 a fourth selecting element selecting said value selected by said third selecting element if said first control signal indicates that said input data symbol is said supplemental data symbol and otherwise selecting a null bit,
 said information bit being output as a first output bit, said value selected by said fourth selecting element being output as a second output bit, and said previous first and second register values being values previously stored in said first and second registers, respectively.

* * * * *